United States Patent [19]

Bank et al.

[11] 3,971,747
[45] July 27, 1976

[54] CURABLE COMPOSITIONS

[75] Inventors: Howard M. Bank, Freeland; Keith W. Michael, Midland, both of Mich.

[73] Assignee: Dow Corning Corporation, Midland, Mich.

[22] Filed: Apr. 11, 1975

[21] Appl. No.: 567,148

[52] U.S. Cl. .................. 260/37 SB; 260/46.5 G; 260/46.5 E; 260/348 SC; 260/824 EP
[51] Int. Cl.² .................. C08L 83/00; C08L 63/00
[58] Field of Search ..... 260/37 SB, 348 SC, 46.5 G, 260/46.5 E, 824 EP

[56] References Cited
UNITED STATES PATENTS

| | | | |
|---|---|---|---|
| 3,154,597 | 10/1964 | McWhorter | 260/824 EP |
| 3,205,197 | 9/1965 | Cohen et al. | 260/824 EP X |
| 3,779,988 | 12/1973 | Rembold et al. | 260/37 SB X |

Primary Examiner—Lewis T. Jacobs
Attorney, Agent, or Firm—Norman E. Lewis

[57] ABSTRACT

Certain aluminum compounds, such as aluminum alkoxides, chelates and acylates, catalyst the reaction of ≡ SiOH with

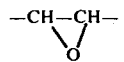

to yield compositions containing

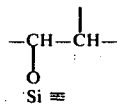

linkages.

36 Claims, No Drawings

CURABLE COMPOSITIONS

The present invention relates to an improved process for reacting silanols with epoxy groups to form ≡SiOC≡ bonds. In one aspect the invention relates to novel curable compositions. In another aspect the invention relates to improved molding compounds.

The condensation products of silicones and epoxide resins are well known. These silicone-epoxide resins are prepared by reacting epoxide resins which contain hydroxyl groups with silanol (≡SiOH) groups present in the silicone to form copolymers via hydroxyl condensation. Exemplary cocondensates are disclosed in U.S. Pat. Nos. 3,055,858 and 3,170,962. The reaction of ≡SiOH with epoxy groups via ring-opening of the epoxide to form ≡SiOC≡ bonds is also known — see U.S. Pat. No. 2,843,560. Other references, such as U.S. Pat. No. 2,819,245, propose a variety of organo functional silicon compounds for reaction with epoxide groups. Generally the prior art recognizes the desirability of combining or copolymerizing epoxy resins with silicone resins to obtain a material having improved properties, such as better antichalking in coatings or humidity resistance in electrical insulation.

The ≡SiOH reaction with epoxy groups via ring-opening does not proceed at any appreciable rate under the influence of heat alone. Previously such reactants have been heated — see U.S. Pat. No. 2,843,560 — and it is surmised that the products obtained upon heating were principally siloxanes (≡SiOSi≡) as formed by silanol condensation. An aluminum compound, polyaluminophenylsiloxane, was utilized by Petrashko and Andrianov (see Plasticichoshio Massy, 1964 (11) 264; 30 RAPRA trans.) to form coordination links between siloxanes and epoxies but polymerization and covalent bonding of the reactants did not occur. Thus, it is surprising that the silicone-epoxy compositions of the present invention coreact in the presence of certain catalytic aluminum compounds to yield products having utility in powder coatings, adhesives, laminating resins and molding compounds.

It is an object of the present invention to provide novel silicone-epoxy compositions.

It is another object of the invention to provide an improved method of reacting certain silicones with epoxy-functional compounds and polymers.

A further object of the invention is to provide an improved molding compound.

These and other objects of the invention will be apparent to one skilled in the art upon consideration of the following detailed description and appended claims.

DETAILED DESCRIPTION OF THE INVENTION

In accordance with the present invention there is provided a method of preparing organosilicon compounds containing a silicon-oxygen-carbon linkage comprising reacting under substantially anhydrous conditions an organosilicon compound containing at least one ≡SiOH group with an organic compound containing at least one epoxy group, the reaction being carried out in the presence of a catalytic amount of an aluminum compound selected from the group consisting of (a) Al(OR)$_3$ in which R is either a hydrogen atom or selected from the group consisting of alkyl radicals containing from 1 to 20 inclusive carbon atoms or aryl and aryl-containing hydrocarbon radicals containing from 6 to 24 inclusive carbon atoms) (b)

in which R is as previously defined, R′ is selected from the group consisting of the hydrogen atom, alkyl radicals containing from 1 to 30 inclusive carbon atoms and aryl or aryl-containing radicals of at least 6 carbon atoms, $n$ having a value of from 0 to 2 and condensates of such compounds; (c) aluminum salts of the formula $$H^+ Al^-(OR)_4$$

in which R is as previously defined; (d) aluminosiloxy compounds of the formula $$\equiv AlOSiR_3{}^2$$

in which R$^2$ is selected from the group consisting of —OR radicals in which R is as defined,

radicals in which R′ is as defined, monovalent hydrocarbon or halohydrocarbon radicals containing from 1 to 30 inclusive carbon atoms, and siloxane moieties of the formula

in which R$^3$ is selected from the group consisting of OR radicals in which R is as defined,

radicals in which R′ is as defined and monovalent hydrocarbon or halohydrocarbon radicals containing from 1 to 30 inclusive carbon atoms, and $a$ has a value of from 1 to 3; the remaining aluminum valences being satisfied by —OAl≡, —OR,

—OCR′
 ‖
 O or —OSiR$_3{}^2$ bonding, R, R′ and R$^2$ being as previously defined; and (e) aluminum chelates formed by reacting compounds (a), (b) or (c) with sequestering agents in which the coordinating atoms are oxygen.

The above-described method is believed to rely upon the mechanism of ring-opening of the epoxy group and reaction with ≡SiOH to provide

linkages in the product. The reaction is initiated in the presence of the listed aluminum catalysts. Of course the rate of reaction will depend upon temperature, the particular organosilicon and epoxy reactants utilized and the degree of activity of the specific aluminum catalyst and amount of catalyst present. The reaction rate can be readily followed by periodically determining consumption of epoxy groups via titration.

Any silicon compound containing at least one silicon-bonded hydroxyl group per molecule can be used in the practice of the present invention. The silanol-functional reactant can be monomeric or polymeric. Thus, the operable organosilicon compositions include silanes, organopolysiloxanes characterized by ☰ SiOSi ☰ units, silcarbanes characterized for example by an ☰ $SiCH_2CH_2Si$ ☰ or ☰ $SiC_6H_4Si$ ☰ type structure; and polymers containing both silcarbane and siloxane structures. The term "polymer" as used herein is intended to include dimers, homopolymers or copolymers having siloxane or silcarbane linkages. Inherent in the use of "organosilicon" is the fact that at least one silicon atom in the compound or polymer contains an organic substituent bonded to the silicon atom by means of a silicon-carbon bond.

The monomeric organosilanes can be represented by the formula $(R^4)_{a'}(A)_{b'}Si(OH)_{4-a'-b'}$ in which $R^4$ is selected from the group consisting of monovalent hydrocarbon radicals and monovalent halogenated hydrocarbon radicals of no more than 30 carbon atoms, $R^4$ being bonded to the silicon atom by a silicon-carbon bond; A is selected from the group consisting of the hydrogen atom and hydrolyzable radicals of the formula OZ, $a'$ is an integer having a value of from 1 to 3 and $b'$ is an integer having a value of 0 to 2, the sum of $a' + b'$ being no more than 3. Thus, the silanes include $R_3^4SiOH$, $R_2^4(A)SiOH$, $R^4(A)_2SiOH$, $(R^4)_2Si(OH)_2$, $R^4ASi(OH)_2$ and $R^4Si(OH)_3$.

Exemplary of the $R^4$ substituents are any monovalent hydrocarbon radical such as alkyl radicals, such as methyl, ethyl, propyl, isopropyl, butyl, pentyl, isopentyl, neopentyl, hexyl, octyl, dodecyl, octadecyl, 3-methylheptyl, 6-butyloctadecyl, tertiary butyl, myricyl and 2,2-diethylpentyl; alkenyl radicals such as, vinyl, allyl, hexenyl, butenyl, 3-octenyl, 4,9-octadecadienyl and 4-nonenyl; alkynyl radicals such as propynyl, heptynyl, butynyl, decynyl; alkenynyl radicals such as 1-penten-3-ynyl, 2-ethyl-1-buten-3-ynyl; cycloaliphatic radicals such as, cyclobutyl, cyclopentyl, cyclohexyl, cycloheptyl, propylcyclohexyl, 2,4-dimethylcyclopentyl, cyclohexenyl, bicyclo[3.1.0]hexyl, tricyclo[3.2.1.1$^{3,8}$]-5-nonenyl, spiro[4.5]decyl, dispiro4.1.4.2]-1-tridecenyl, decahydronaphthyl, 2,3-dihydroindyl- and 1,2,3,4-tetrahydronaphthyl aryl radicals such as, phenyl, tolyl, xylyl, 2-ethylphenyl, xenyl, naphthyl, anthracyl, pentacenyl, 3,4-methylethylphenyl, 9,9'-bifluoryl and 4-m-terphenyl; and aralkyl radicals such as 2-phenyl-octyl, 3-methyl-2-(4-isopropylphenyl)hepthyl, benzyl, 2-ethyltolyl, 2-ethyl-p-cymyl, diphenylmethyl, 4,5-diphenylpentyl, 2-phenylethyl and 2-phenylpropyl and haloalkyl radicals such as chloromethyl, 3-chloropropyl, bromooctadecyl, 3,3,3-trichloropropyl, chloroisopropyl or 2(perfluoroalkyl)ethyl radicals in which the perfluoroalkyl radical is trifluoromethyl, perfluoroethyl, perfluoroisobutyl or perfluorooctadecyl; halocycloalkyl radicals such as bromocyclohexyl, chlorocyclopentyl or fluorocyclohexyl; haloaryl radicals such as 2,4-dichlorophenyl, dibromoxenyl, alpha, alpha, alphatrifluorotolyl, iodonaphthyl and tetrachlorophenyl and haloaralkyl radicals such as 2(chlorophenyl)ethyl, p-chlorobenzyl or 2(bromophenyl)propyl.

In addition to the hydrogen atom, A can be a hydrolyzable group of the formula —OZ in which Z is any hydrocarbon or halogenated hydrocarbon group such as methyl, ethyl, isopropyl, octadecyl, allyl, hexenyl, cyclohexyl, phenyl, benzyl, beta-phenylethyl, 2-chloroethyl, chlorophenyl, 3,3,3-trifluoropropyl or bromocyclohexyl; any hydrocarbon ether radical such as 2-methoxyethyl, 2-ethoxyisopropyl, 2-butoxyisobutyl, p-methoxyphenyl or —$(CH_2CH_2O)_2CH_3$; or any acyl radical such as acetyl, propionyl, benzoyl, cyclohexoyl, acrylyl, methacrylyl, stearyl, naphthoyl, trifluoroacetyl, chlorobenzoyl or bromopropionyl. The preferred —OZ groups are those in which Z is an alkyl radical of 1 to 3 inclusive carbon atoms. The term "hydrolyzable group" means a group attached to the silicon which is hydrolyzed by water at room temperature to form silanol groups.

These hydroxy-functional silanes are known monomers which can be prepared by hydrolysis or partial hydrolysis of the corresponding hydrolyzable silanes. Those silanes in which $R^4$ is a lower alkyl (no more than 6 carbon atoms) or a phenyl radical are preferred. Exemplary silanes include $(CH_3)_3SiOH$, $C_6H_5(C_2H_5)Si(OH)_2$, $CH_3(C_6H_4Cl)_2SiOH$, $ClCH_2CH_2CH_2(CH_3)_2SiOH$, $CH_3(C_3H_7O)C_6H_5SiOH$, $CF_3CH_2CH_2(CH_3)Si(OH)_2$ and $C_6H_5(CH_3)(CH_3O)SiOH$.

Hydroxyl-functional organopolysiloxanes can be represented by the formula

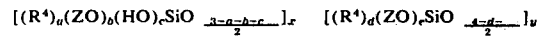

in which $R^4$ and Z are as previously defined, $a$ is an integer having a value of 1 or 2, $b$ having a value of 0 or 1, the sum of $a + b$ being no more than 2, $c$ having a value of 1 or 2, $d$ having a value of from 1 to 3, $e$ having a value of from 0 to 2, the sum of $d + e$ being no more than 3, $x$ having a value of at least 1, $y$ having a value of 0 or more.

The hydroxylated polymer can be in the form of a liquid, a high gum or a resin. In those polymers of higher molecular weight (wherein $y$ has a substantial value, for example 100 or more) it is preferred that the hydroxyl content be at least two weight percent of the polymer. As was the case with the monomeric silane, it is preferred that the $R^4$ substituents of the polymer be lower alkyl radicals of from 1 to 6 inclusive carbon atoms or the phenyl radical. It is also preferred that $b$ and $e$ both be very low in value; i.e., that the polymer be substantially fully hydroxylated rather than containing significant residual alkoxy groups.

Examples of the preferred siloxane units include $(CH_3)_2(HO)SiO_{1/2}$, $(CH_3)_2SiO$, $CH_3(C_6H_5)(HO)SiO_{1/2}$, $CH_3SiO_{3/2}$, $CH_3(C_6H_5)SiO$, $C_3H_7(CH_3)SiO$, $C_6H_5(OH)SiO$, $(C_6H_5)_2SiO$ and $C_6H_5(CH_3)_2SiO_{1/2}$. Minor amounts of $SiO_2$ units may be present in the polymers. The organopolysiloxanes are well-known and are prepared by techniques described in the prior art. For example, preferred resinous polymers having from 1.0 to about 1.8 organic substituents per silicon atom are readily prepared by hydrolyzing the corresponding organochlorosilanes with further condensation of the hydroxyl substituents to form ≡SiOSi≡ with some residual hydroxyl present. As will be described herein such resinous polymers are particularly suitable for use in molding compounds.

Hydroxyl-functional silcarbanes are also useful in the practice of the invention. As is well-known, the silcarbanes are formed with divalent hydrocarbon bridges between silicon atoms. The divalent bridging hydrocarbon radicals may contain singly or in any combination groups such as methylene, vinylene, vinylidene, phenylene, cyclohexylidene, tolylene and toluenyl. The hydroxy-functional silcarbanes can be represented as

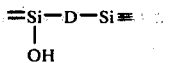

wherein D is a divalent hydrocarbon radical and the remaining valences are satisfied by other D radicals, the hydroxy group, $R^4$ radicals or —OSi≡ units.

The silanol-functional compounds are reacted with compounds containing at least one epoxide group, i.e. the oxirane ring

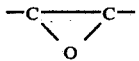

in their structure. The epoxy reactant may be saturated or unsaturated, aliphatic, cycloaliphatic, aromatic or heterocyclic and may contain substituents such as ether groups and the like. The reactant may be a monomer or an epoxy-functional polymer, and in either the form of a liquid or a solid resin.

The simple monomeric epoxy reactants include cyclohexene oxide and derivatives thereof, styrene oxide and glycidyl ethers. Examplary of the glycidyl ethers are methyl glycidyl ether, ethyl glycidyl ether, propyl glycidyl ether, phenyl glycidyl ether and allyl glycidyl ether. Polyepoxides, for example, diepoxides; vinyl cyclohexene dioxide; butadiene dioxide; 1,4-bis(2,3-epoxypropoxy)benzene; 4,4'-bis(2,3-epoxypropoxy)-diphenyl ether, 1,8-bis(2,3-epoxypropoxy)octane; 1,4-bis(2,3-epoxypropoxy)cyclohexane, the diglycidyl ether of polyethylene glycol, the diglycidyl ether of polypropylene glycol, isoprene diepoxide, bis(3,4-epoxy-6-methylcyclohexylmethyl)adipate are preferred for use in the described method because of their utility as curable compositions.

The more complex epoxy reactants include well-known polyfunctional resins such as obtained by reaction of polyhydric phenols with either polyfunctional halohydrins or polyepoxides or mixtures thereof. Illustrative of polyhydric phenols utilized in making such resins are mononuclear phenols, such as resorcinol, hydroquinone and catechol, or polynuclear phenols, such as bis-phenol(p,p'-dihydroxy diphenyl dimethyl methane), p,p'-dihydroxybenzophenone; p,p'-dihydroxydiphenyl; p,p'-dihydroxy dibenzyl; bis(4-hydroxyphenyl)sulfone; 2,2'-dihydroxy-1,1'-dinaphthyl methane; polyhydroxy naphthalenes and anthracenes; o,p-,o',p'-tetrahydroxy diphenyl dimethyl methane and other dihydroxy or polyhydroxy dipheny or dinaphthyl methanes. Suitable polyepoxide reactants are listed above and others are well-known — see U.S. Pat. No. 3,170,962 for a further listing of such polyepoxides and U.S. Pat. No. 2,592,560 for a description of reaction conditions used to synthesize the resins. When reacting polyhydric phenols with halogen compounds any of the epihalohydrins may be utilized. Examples of suitable halohydrins include 1-chloro-2,3-epoxypropane (epichlorohydrin), 1-bromo-2,3-epoxypropane, 1-fluoro-2,3-epoxypropane, bis(3-chloro,2-hydroxy propyl)ether, 1,4-dichloro-2,3-dihydroxy butane, 2-methyl-2-hydroxy-1,3-dichloropropane, bis-(3-chloro,2-methyl,2-hydroxy propyl)ether and other dichlorohydrins derived from aliphatic olefins, mannitol, sorbitol and other alcohols. The proportions of reactants as well as reaction conditions involved in the polyhydric phenol epihalohydrin synthesis are well-known and are described in detail in U.S. Pat. Nos. 2,615,007 and 2,615,008. Of course, these polyepoxide resins may contain unreacted hydroxyl groups.

One class of preferred resins are the cycloaliphatic polyepoxide monomers or prepolymers which contain at least one 5- or 6-membered ring (or heterocyclic ring with equivalent properties) which is substituted with the epoxide-functional group. In the polycyclic cycloaliphatic epoxides, the two rings are preferably independent, being joined by a bridging radical at least one ester or ether linkage. A plurality of ester or ether linkages can alter the flexibility of the cured product. Examples of commercially available cycloaliphatic resins include

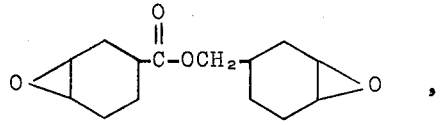

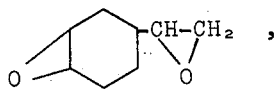

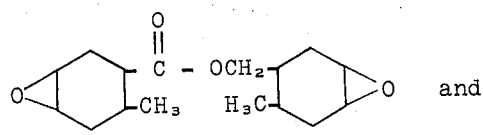 and

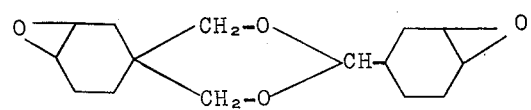.

Further examples of cycloaliphatic epoxide compounds are described in U.S. Pat. No. 3,117,099.

Silylated epoxides are also useful in the practice of the invention. Monoepoxides, such as

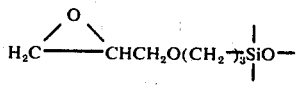

and

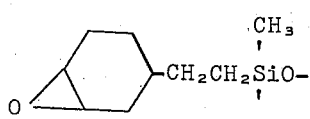

are exemplified in U.S. Pat. No. 3,445,877. Silylated polyepoxides are described in U.S. Pat. Nos. 3,223,577 and 3,516,965.

As was described above, the silanol-functional compound is reacted with the epoxide in the presence of an aluminum catalyst. The aluminum catalysts are selected from the group consisting of (a) Al(OR)$_3$ in which R is either a hydrogen atom or selected from the group consisting of alkyl radicals containing from 1 to 20 inclusive carbon atoms or aryl and aryl-containing hydrocarbon radicals containing from 6 to 24 inclusive carbon atoms; (b)

$$Al(OR)_n(OCR')_{3-n}$$
$$\parallel$$
$$O$$

in which R is as previously defined, R' is selected from the group consisting of hydrogen atoms, alkyl radicals containing from 1 to 30 inclusive carbon atoms and aryl or aryl-containing radicals of at least 6 carbon atoms, n having a value of from 0 to 2 and condensates of those compounds in which n has a value of 1 or 2; (c) aluminum salts of the formula $$H^+ Al^-(OR)_4$$

in which R is as previously defined; (d) aluminosiloxy compounds of the formula $$\equiv AlOSiR_3^2$$

in which R$^2$ is selected from the group consisting of —OR radicals in which R is as defined, $$-OCR'$$
$$\parallel$$
$$O$$

radicals in which R' is as defined, monovalent hydrocarbon or halohydrocarbon radicals containing from 1 to 30 inclusive carbon atoms, and siloxane moieties of the formula $$-OSiO_{3-a}$$
$$\mid$$
$$R_a^3$$

in which R$^3$ is selected from the group consisting of OR radicals in which R is as defined, $$-OCR'$$
$$\parallel$$
$$O$$

radicals in which R' is as defined and monovalent hydrocarbon or halohydrocarbon radicals containing from 1 to 30 inclusive carbon atoms, and $a$ has a value of from 1 to 3; the remaining aluminum valences being satisfied by —OAl≡, —OR,, $$-OCR'$$
$$\parallel$$
$$O$$

or —OSiR$_3^2$ bonding, R, R' and R$^2$ being as previously defined; and (e) aluminum chelates formed by reacting compounds (a), (b) or (c) with sequestering agents.

In addition to aluminum trihydroxide, the catalysts defined by (a) include aluminum alcoholates wherein the R substituents is an alkyl or aryl-containing radical. Exemplary of such R substituents are alkyl, such as methyl, ethyl, pentyl, octyl, 3-methylheptyl, octadecyl, 6-butyloctadecyl and myricyl radicals and aryl-containing (aryl, aralkyl and alkaryl) radicals containing at least 6 carbon atoms, such as phenyl, tolyl, xylyl, 2-ethylphenyl, xenyl, naphthyl, anthracyl, 3,4-methylethylphenyl, 2-phenyl-octyl, 2-ethyltolyl, diphenylmethyl, 4,5-diphenylpentyl and 2-phenylpropyl.

Illustrative of the aluminum alcoholates, Al(OR)$_3$, are the trialkoxides, such as aluminum triethoxide, aluminum tri-isopropoxide, aluminum tri(sec-butoxide), aluminum tri-3-amyloxide, trioctoxyaluminum, tridodecyloxyaluminum, trihexadecyloxyaluminum and trioctadecyloxyaluminum; alkoxyarylaluminates, such as di-isopropoxidecresyl aluminate; and aryl aluminates, such as tri(o-cresyl)aluminate, tri(m-cresyl)aluminate, tri(2,4-xylenyl)aluminate, tri(hexylphenyl)aluminate, tri(nonylphenyl)aluminate, tri(dinonylphenyl)aluminate, tri(dodecylphenyl)aluminate and tri(2-naphthyl)aluminate. Preferred triaryl aluminates are those in which the —OR substituent represents the residue of a readily distillable phenolic compound, such as phenol or alkylphenols having 1 to 18 alkyl carbon atoms.

The second class of aluminum catalysts, the acylates, (b) contain at least one $$-\underset{\underset{O}{\|}}{O}CR'$$

radical in which R' is a hydrogen atom, an alkyl radical such as previously described or an aryl such as the phenyl radical or the previously described alkaryl or aralkyl radicals.

The aluminum acylates (b) include aluminum triacylates, such as aluminum triacetate, aluminum tripropionate, aluminum tribenzoate, aluminum tristearate, aluminum tributyrate, aluminum-diacetate-monostearate and aluminum tri(3-methylbenzoate). Also included when $n$ equals 1 or 2 are hydroxylated or alkoxylated aluminum acylates such as aluminum hydroxydistearate, aluminum monoisopropoxide dibenzoate, aluminum hydroxy diacetate, aluminum dihydroxy monobutyrate and aluminum ethoxide distearate. Other such primary and secondary salts, the corresponding mono- and di-carboxylic acid aluminum alcoholates and method of their preparation are described in U.S. Pat. No. 2,932,659.

As is well known the alkoxy and hydroxy-functional aluminum can be subjected to condensation polymerization to form dimers, trimers and cyclic polymers which retain acyloxy functionality.

$$(CH_3O)(CH_3\underset{\underset{O}{\|}}{C}O)AlOAl(O\underset{\underset{O}{\|}}{C}CH_3)(OCH_3)$$

is one such aluminum condensate. If desired the aluminum acylate catalysts can be formed insitu by adding an inactive compound, such as aluminum lactate, aluminum borate, or aluminum phenoxide and a carboxylic acid, such as stearic acid or benzoic acid to the reactant mixture.

The third class of aluminum catalysts is the salt of an aluminum trialkoxide. For example, suitable salts include $H^+ Al^-(OC_3H_7)_3OCH_3$, $H^+ Al^-(OC_4H_9)_4$ and $H^+ Al^-(OC_6H_5)(OC_3H_7)_3$.

The reaction (condensation) products of aluminum alkoxides or aluminum acylates with ≡SiOH or silicon-bonded hydrolyzable radicals are also useful as catalysts. These aluminosiloxy compounds are represented by the formula $$\equiv AlOSiR_a^2$$

in which $R^2$ and $a$ are as previously defined. Because of the siloxy-functionality these catalysts are more readily dispersed and of greater solubility in the reactants, whereas certain of the other listed aluminum compounds do not have appreciable solubility in the reactants. Examples of such alumino-siloxy catalysts include the reaction product of aluminum ethoxide with methyldimethoxysilanol, the reaction product of aluminum isopropoxide with dimethyldiacetoxysilane, the reaction product of aluminum hydroxy distearate with trimethylsilanol, the reaction product of aluminum diacetate benzoate with $$HO[(CH_3)_3SiO]H_{25-60},$$

the reaction product of aluminum propinate with 3-chloropropyltriethoxysilane and the like. Methods of synthesizing alumino-siloxy compounds are well-known as shown in U.S. Pat. Nos. 3,061,587, 3,152,999 and 3,184,418.

These alumino-siloxy compounds may be generated insitu, for example one may add methyltrimethoxysilane and aluminum hydroxy diacetate to the reactants. It may be that, in all cases, the truely active catalytic species contains an Si-O-Al bond and that this species is formed when aluminum compounds (a), (b), (c) and the like are added to the silanol-containing reactant. It is obvious that other than the named aluminum compounds will react with the hydroxy-functional silicon atoms to form alumino-siloxy catalysts. For example trimethyl aluminum can be reacted with trimethylsilanol to form $(CH_3)_2AlOSi(CH_3)_3$ which acts as a catalyst for the reaction.

The aluminum chelate catalysts are known compounds formed by reacting aluminum alkoxide or acylates with nitrogen and sulfur-free sequestering agents containing oxygen as the coordinating atom, such as ethyl acetoacetate, acetylacetone, diethyl malonate and acetoacetic acid esters of high molecular weight alcohols, such as stearyl alcohol.

The described aluminum catalysts are selective to the extent that, under the reaction conditions, there is ring-opening of the epoxy group to form $$\equiv Si\underset{\underset{|}{}}{O}CH-$$

but there is a minimum of silanol-silanol condensation. The silanol-epoxy reaction is predominate as evidenced by the substantial lack of or only minimal evolution of water which accompanies the ≡SiOH condensation. It has been found that the presence of water seriously inhibits the catalytic action of the described aluminum compounds in promoting the silanol-epoxy reaction. Other organo-metalic compounds, such as aluminum glycinate, aluminum borate, stannous stearate, cobalt octoate, tetraisopropyltitanate and lead acetate, catalyze silanol condensation to the extent that a foamed product is obtained and reaction of the silanol with the epoxide is minimal.

The reaction between the silanol and epoxy group is accomplished by heating under substantially anhydrous conditions a mixture of the described reactants and aluminum catalyst. Substantially anhydrous conditions is taken to mean that there is less than 0.5 weight percent, preferably less than 0.05 weight percent free water present in the mixture of reactants. The reaction temperature will vary depending upon the specific reactants present, the amount and activity of the particular aluminum catalyst utilized and the nature of any additives or fillers in the reaction mixture. Generally the temperatures will vary frm 20° to 250°C. Certain of the catalysts are latent to the extent that they possess no significant activity below 100°C. This is an advantage in that mixtures of the coreactants and catalysts have a long shelf life and the inherent difficulties of premature cure are minimized. Of course, the time necessary to complete the reaction will vary with temperature also. Generally, a temperature which provides complete reaction or curing in about 30 minutes or less is preferred.

The quantity of coreactants utilized in the above method can vary over a wide range depending upon the nature of the desired product. If desired, the epoxide can be combined with less than a chemical equivalent amount of the silanol coreactant. The term "chemical equivalent amount" refers to the amount of organosilicon coreactant needed to furnish one silanol group for every epoxy group. That amount is, of course, a function of the silanol content of the organosilicon coreactant. Generally, the method is carried out utilizing a chemical equivalent amount of 0.1:1 to 5:1 of organosilicon reactant to epoxy reactant. When fillers are combined with the coreactants, it is preferred to utilize 0.5:1 to 2:1 chemical equivalent of organosilicon to epoxy reactant.

Catalytic amounts of the defined aluminum compounds must be present. The specific amount of catalyst is not critical so long as there is a minimum amount necessary to promote the reaction. This minimun effective amount will vary with the specific catalyst, the coreactants utilized and the reaction conditions. If the aluminum catalyst is soluble in one or both of the coreactants the effective amount is less than when the same aluminum compound is utilized in combination with reactants in which the material is insoluble. Catalytic amounts as low as 0.05 percent by weight based on the total weight of reactants have been observed to promote the reaction at a practical rate. Amounts greater than 5 weight percent do not provide any further optimization of cure rate or properties in the reaction product.

The coreactants and catalyst can be mixed in any desired manner. When low viscosity liquids are utilized, stirring may be sufficient to provide a homogeneous mixture of the coreactants and catalyst. Solid materials can be mixed by milling or blending of powders. If desired, solvents may be added to facilitate mixing.

The reaction mixture can contain small amounts of conventional additives, such as plasticizers, release agents and fire retardants; pigments, such as titanium dioxide, carbon black and iron oxide. This composition can also include solid fillers, both reinforcing fillers and extending filling as conventionally used in other silicone compositions. The reinforcing fillers preferably are the reinforcing silica fillers, both treated and untreated. The reinforcing silica fillers include fume silica, silica aerogel, silica zerogel, and precipitated silicas. The reinforcing silica fillers can be treated with the conventional organosilicon treating agents which are well known in the art and include organosilanes, such as methyldichlorosilane or glycidoxypropyltrimethoxysilane, organosiloxanes such as hexamethylcyclotrisiloxane and organosilazanes such as hexamethyldisilazane. Examples of extending fillers include, asbestos, crushed fused quartz, aluminum oxide, aluminum silicate, zirconium silcate, magnesium oxide zinc oxide, talc, diatomaceous earth, iron oxide, calcium carbonate, clays, titanium dioxide, zirconia, mica, glass, sand, carbon black, graphite, barium sulfate, zinc sulfate, wood flour, cork and fluorocarbon polymer powder among others. Materials which inactivate the aluminum catalyst or otherwise adversely affect the reaction, such as significant quantities of certain amines, are to be excluded.

It is apparent that the present invention also provides novel compositions. The compositions within the scope of the present invention comprise a mixture of (A) an organosilicon compound containing at least one silicon-bonded hydroxyl group; (B) an organic compound containing at least one epoxy group and (C) a catalytic amount of an aluminum compound selected from the group previously described herein, there being sufficient organosilicon compund (A) present to provide at least 0.1 ≡ SiOH groups per epoxy group present in (B). All components (A), (B) and (C) of this composition have been described in detail with regard to the method of the present invention and further description would be repetitious. When the composition contains polyfunctional reactants it can be characterized as "curable" and it is believed that the composition cures by means of the described reaction of the silanol with the epoxy group in the presence of the aluminum catalyst. Of course, the invention is not restricted to this reaction alone to account for the cure. The cure rate will vary with the particular catalyst (C), the nature of coreactants (A) and (B) and the cure temperature.

These reactive compositions vary in physical properties and form. They range from low viscosty fluids to powdered solids. Reaction of these compositions, such as by exposure to elevated temperatures, result in fluids of increased viscosity, sometimes to the stage of gellation while other compositions form hard resinous materials. Thus, the compositions have a variety of uses, such as surface coatings, as impregnating resins for laminates, as adhesives, as a powder coating, as pottings and castings for electrical devices and as binders for molding compounds.

Preferred reactive compositions contain at least 0.1 chemical equivalents of organosilicon reactant per epoxy-functional equivalent; more preferred compositions containing from 0.5:1 to 1.5:1 chemical equivalents of the silanol-functional organosilicon compound in which the organosilicon compound contains at least 2.5 weight percent silicon-bonded hydroxyl groups.

In a specific embodiment, a curable composition comprises (A) from 10 to 60 weight percent of a phenyl polysiloxane resin having a degree of substitution of 1.0 to 1.7 and a silicon-bonded hydroxyl content of from 2.5 to 10 weight percent; (B) from 40 to 90 weight percent of a polyepoxide, i.e. those having more than one

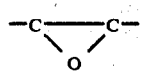

group per molecule and 0.1 to 5 weight percent, based on the combined weight of (A) and (B) of an aluminum catalyst (C) selected from the group consisting of aluminum acylates of the formula

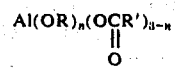

in which R, R', m and n are as previously described. The preferred polyepoxides include the glycidyl ethers of polyphenols and cycloaliphatic polyepoxides. These compositions have particular utility as potting and encapsulating resins for electronic devices and in formulating molding compounds.

The preferred phenylpolysiloxane resin (A) is of the formula

in which $R^4$ is an alkyl radical of from 1 to 3 carbon atoms or phenyl radical and $a$ has an average value of from 1.0 to 1.7. The phenyl silicon ratio of such resins is generally in the range of 0.20 to 1.5. Thus, the phenylsiloxane resin can contain units such as $C_6H_5SiO_{3/2}$, $CH_3SiO_{3/2}$, $C_2H_5SiO_{3/2}$, $C_3H_7SiO_{3/2}$, $C_6H_5(CH_3)SiO$, $(CH_3)_2SiO$, $CH_3(C_3H_7)SiO$, $(C_6H_5)_2SiO$ and minor amounts of triorganosiloxy groups such as $(CH_3)_3SiO_{1/2}$. Preferably the organosiloxane resin contains from 2.5 to 7 weight percent silicon-bonded hydroxyl groups.

Exemplary of the epoxy resins (B) of the specific embodiment are the reaction products of polyhydric phenols with epihalohydrins (glycidyl ethers of polyhydric phenols), such as the polyglycidyl ether of 2,2-bis-(parahydroxyphenyl)propane; and the polyglycidyl ether of the novalac condensation product such as the triphenylols, pentaphenylols and heptaphenylols described in U.S. Pat. No. 2,885,385. Another suitable class of epoxy resins are the cycloaliphatic polyepoxides having an epoxide equivalent (grams of resin containing one gram equivalent of epoxide) more than 65 such as vinyl cycloahexene dioxide and 3,4-epoxycyclohexylmethyl-3,4-epoxycyclohexanecarboxylate. A detailed description of cycloaliphatic polyepoxides can be found in Canadian Pat. No. 868,444. Of the aluminum acylate catalysts, the aluminum stearate, distearate and benzoate species are preferred.

In addition to the three necessary components, the curable compositions can contain solvents, diluents, conventional additives and pigments as previously described. It is within the scope of the present invention to include reactive diluents in the compositions. Reactive diluents, such as hydroxyl-terminated phenyl methyl polysiloxane fluid or phenyl glycidyl ether, can be added to the high viscosity or solid resins of the specific embodiment to provide easier mixing and handling of the uncured composition. Reactive diluents can also be used to modify the properties of the cured composition. For example, inclusion of sufficient quantities of dibromophenyl glycidyl ether or the diglycidyl ether of tetrabromo-bis-phenol-A will render the cured composition substantially self-extinguishing which s of particular interest when encapsulating electrical devices.

Fillers can also be added to compositions utilized as encapsulants and molding compounds. The solid inorganic fillers, either particulate or fibrous, are generally present in an amount in the range of 30 to 90 weight percent base on the total weight of molding compound. Of the previously-described fillers, granular fused silica and/or glass fibers are preferred when the molding compound is utilized to encapsulate electronic devices.

The following examples are illustrative of the described method and reactive compositions. Such examples are not intended as limiting of the invention set forth in the claims. In the examples all percentages refer to weight percent, unless otherwise specified.

EXAMPLE 1

A mixture of 2.52 grams (27.97 meq.) of trimethylsilanol, 4.20 grams (27.97 meq.) of phenyl glycidyl ether and 0.12 grams of aluminum hydroxydistearate was heated for 80 minutes at 90°C. A sample of the reaction mixture was titrated to determine epoxide equivalent, showing the reaction to be 60 percent complete on the basis of epoxide consumption. After an additional 4 ½ hours at 90°C., the reaction was about 88 percent complete as determined by the amount of epoxy consumed. The bulk viscosity of the reaction mixture had increased substantially.

Approximately 10 percent of the available silicon was isolated by distillation from the reaction mixture in the form of the following isomeric adducts:

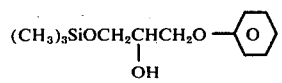

and

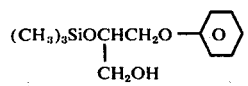

Structure identification of the isomers was made by means of H' n.m.r. and infra-red analysis. The isomers were present in a ratio of approximately 1:1 in the isolated product. The other products in the reaction mixture were primarily siloxanes and silylated epoxy polymerization products.

EXAMPLE 2

A mixture of 9.36 grams (62.4 meq.) of phenyl glycidyl ether, 13.34 (62.4 meq.) of diphenylmethylsilanol and 0.13 grams of aluminum tri-isopropoxide was placed in a flask which was equipped with a magnetic stirrer, thermometer and a reflux condenser. The flask was placed in a 70°C. oil bath and the reactants were stirred. After eight minutes, the reaction mixture had exothermed at 130°C. After stirring for an additional 5 minutes, the reaction mixture was cooled to room temperature.

The reaction product was analyzed. The low residual epoxide content (about 1 mol%) showed that the reaction was substantially complete in 13 minutes. The product contained 22 mol% ≡ SiOC ≡ bonding as determined by the analytical technique described by J. A. Magnusun, Anal. Chem. 35(10), pgs. 1487–89 (1963).

A second mixture of the above reactants in a solvent (6.5 grams of phenyl glycidyl ether and 8.55 grams of diphenylmethylsilanol in 79 grams of carbon tetrachloride) was heated to 70°C. and 0.084 grams of aluminum triisopropoxide was added. After maintaining the mixture at 70°C. for 192 minutes, the reaction in the solvent was 81.6% complete as determined by unconsumed phenyl glycidyl ether and the reaction product contained 26 mol% ≡ SiOC ≡ bonding as determined by the previously-described analytical method. This same reaction was also run utilizing toluene and ansul ether as solvents. The use of these solvents gave slower reaction rates.

EXAMPLE 3

A mixture of equimolar amounts of diphenylmethylsilanol and cycloaliphatic epoxy resin precurser of the formula

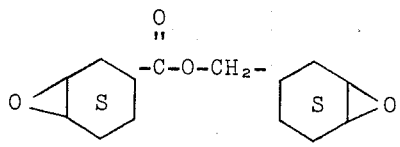

containing 2 percent aluminum acetylacetonate was reacted at room temperature (21°C.). Titration for epoxy equivalent in the reaction mixture showed the reaction to be 15 percent complete in 46 minutes and 52 percent complete after 24 hours at room temperature. This same reaction in the presence of the aluminum acetylacetonate catalyst was complete in 10 minutes at 80°C.

In a similar experiment, equimolar (10 meq.) amounts of trimethylsilanol and propylene oxide were reacted in the presence of 4 weight aluminum acetylacetonate. After 3 hours at from 60°–80°C., the reaction was 52 percent complete. When 2 meq. of silanol-free hexamethyldisiloxane was added to the above amount of trimethylsilanol/propyleneoxide catalyzed mixture, the reaction was 28 percent complete (as measured by epoxy consumed) after 3 hours at from 60°–70°C.

A third type of reaction utilizing a siloxane polymer was run. A mixture of 9.36 grams (62.4 meq.) of phenyl glycidyl ether, 19.28 (62 meq. of —OH) of the phenylmethylpolysiloxane resin described in Example 4 and 0.13 grams of aluminum tri-isopropoxide was heated in a 70°C. oil bath. After 12 minutes, the reaction had exothermed to 135°C. The reaction was substantially complete after 12 minutes as determined by the (4 mol%) small amount of epoxy remaining in the product. The reaction product contained 58 mol% ≡ SiOC ≡ as determined by the previously described analytical method as corrected for the amount of

and ≡ COH present.

This example demonstrates that a variety of reaction conditions, including reaction at room temperature, are within the scope of the invention.

EXAMPLE 4

The catalytic activity of various compounds was determined by briefly heating in an open dish 6.8 grams of phenylmethylsilicone resin with 3.4 grams of a commercially available cresol novalac epoxy resin on a 175°C. hotplate and stirring until a homogeneous mixture was obtained. The silicon resin contained major amounts of $CH_3SiO_{3/2}$ and $C_6H_5SiO_{3/2}$ units and had an R/Si ratio in the range of 1.1 to 1.3, a $C_6H_5/Si$ ratio in the range of 0.5 to 0.7 and a hyroxy content of about 5.5 weight percent. The epoxy resin was epoxidized cresol novalac having a molecular weight of about 1170 and epoxide equivalent weight of 230. After the silicon-epoxy mixture was cooled, approximately 0.2 grams of the specific aluminum compound was weighed onto the resin which was then returned to the 175°C. hotplate. One minute after heating was begun the aluminum compound was stirred into the reactant mixture and time to gellation was observed. The various catalysts used and type of cure obtained are listed below:

| Catalyst | Observation at 175°C. |
|---|---|
| aluminum stearate | hard flexible solid in 3 min. |
| aluminum hydroxystearate | hard flexible solid in 1.4 min. |
| aluminum hydroxydistearate | hard flexible solid in 2 min. |
| aluminum resinate | hard flexible solid in 2 min. |
| aluminum oleate | hard flexible solid in 5 min. |
| aluminum benzoate | hard flexible solid in 11 min. |
| aluminum naphthenate | hard flexible solid in 1.4 min. |
| aluminum palmitate | hard flexible solid after 2 min. |
| aluminum tri-isopropoxide | rubbery gel in 13 min. |
| aluminum di-isopropoxide stearate | hard flexible solid in 2.5 min. |
| aluminum isopropoxide distearate | hard solid in less than 2 min. |
| aluminum di-sec-butoxide acetoacetic ester chelate | hard flexible solid in 2 min. |
| aluminum di-isopropoxide acetoacetic ester chelate | hard flexible solid in 3 min. |
| $(CH_3)_3SiOAl(OCC_{17}H_{35})_2$ with =O | cheezy gel after 3 min. |
| $(CH_3)_3SiOAl(OC_3H_7)(OCC_{17}H_{35})$ with =O | cured as soon as stirring begun, hard but not flexible |
| $[(CH_3)_3SiO]_3Al$ | tough flexible solid in 2.5 min. |
| $[CH_3(CH_3O)_2SiO]_3Al$* | soft flexible solid in 15 min. |
| $Al(OC_4H_9)_3$ | hard flexible solid in 2.5 min. |
| $Al(OC_4H_9)_{2.6}(OCC_{17}H_{35})_{0.4}$ with =O | hard flexible solid in 2.5 min. |

*prepared by reaction of $AlCl_3$ with $CH_3Si(OCH_3)_3$

There was no significant gas evolution during curing of the above compositions. This indicates that hydroxyl condensation to form siloxanes was not the predominate cure mechanism. Hydroxyl condensation, of course, generates water which, in any significant amount, inhibits curing. Other compounds were tested by the above-described method and showed activity as silanol condensation catalysts to the extent of precluding any other reaction. Some compounds, such as aluminum borate, stannous stearate, stannous citrate and indium acetylacetonate, were such active condensation catalysts as to result in foaming (resulting from volatilization of water) under the cure conditions.

The aluminum catalyst can be generated insitu. In one instance, a portion of a catalyst was generated insitu by adding 1 gram of stearic acid to the 0.2 grams of aluminum lactate which was then stirred into the heated mixture of the described reactants. Aluminum stearate was thus formed during the reaction. The use of the stearic acid-aluminum lactate combination gave a soft gel in 88 minutes at 175°C. as compared to the viscous fluid obtained after 120 minutes by the use of aluminum lactate alone. Aluminum lactate is considered to have only minimal catalytic activity.

These data demonstrate the varying catalytic activity of the aluminum compounds utilized in the practice of the invention.

EXAMPLE 5

Curable compositions suitable for use as encapsulating and casting resins were prepared by adding the phenylmethyl silicone resin described in Example 4 to a stirred heated mixture of phenylglycidyl ether and the diglycidyl ether of bis-phenol A to provide a homogeneous mixture of reactants containing 60% silicone resin, 20% phenyl glycidyl ether and 20% of the epoxy resin, having an SiOH/epoxy ratio of about 0.7:1 and a viscosity at 25°C. of 5000 cs. After cooling to room temperature, 100 grams of this reactant mixture was blended with 98 grams of crushed quartz filler, 2 grams of carbon black pigment and 0.1 grams of aluminum stearate catalyst. The formulation was mixed in a Waring Blender and degassed under vacuum at room temperature. The filled formulation had a viscosity at 25°C. of 35,000 cs. Because of the small amount of catalyst (0.1% BOR), the pot life of the formulation was greater than 2 months, yet castings of the material were cured in 2 hours at 100°C. The cured castings had a flex strength of 15,000 p.s.i. and a hardness (Durometer-Shore D at 25°C.) of 85.

A second composition was prepared by adding a phenylpropyl silicone resin to a stirred heated mixture of a silicone fluid, phenyl glycidyl ether and the above-described epoxy resin. The silicone resin consisted essentially of $C_6H_5SiO_3/_2$ and $C_3H_7SiO_3/_2$ units and had a hydroxy content of about 6 percent. The $\phi$/Si ratio of the resin was in the range of 0.65:1 to 0.75:1. The silicone fluid was a silanol terminated diorganopolysiloxane consisting of $C_6H_5(CH_3)SiO$ units and had a viscosity in the range of 400 to 800 cs. as measured at 25°C. The mixture of reactants, containing 40 percent phenyl propyl silicone resin, 20 percent phenylmethyl silicone fluid, 30 percent epoxy resin and 10 percent phenyl glycidyl ether, had a viscosity of 2600 cs. at 25°C. and contained 0.75 silanol groups per epoxy group. This reactant mixture was utilized in formulating a potting composition having the proportions as described above; i.e., 100 parts resin, 100 parts filler and pigment and 0.1 parts catalyst. The filled formulation had a viscosity of 17,200 cs. as measured at 25°C. When cast and cured for 2 hours at 100°C., the material exhibited a flexural strength of 4000 p.s.i. and a "Shore-D" hardness of 80 at 25°C.

Cured samples of both materials were tested to determine environmental effects. Discs of the material (2 inch diameter × ⅛ inch thick) were cured for 2 hours at 100°C. After heating at 150°C. for 24 hours both formulations exhibited less than 2 percent weight loss. When immersed in water for 7 days at 25°C., neither material showed more than 0.2 percent weight gain. Immersion in toluene at room temperature for 24 hours gave about 5 percent weight gain in both materials with only minor surface flaking. The cured compositions were found to be flammable as determined by a vertical flammability test. The compositions can be rendered self-extinguishing by the incorporation of brominated epoxy compounds or use of conventional additives, such as tris(chloroalkyl)phosphates or brominated analogs. In one instance, 20 percent dibromophenyl glycidyl ether was mixed with 50 percent of the described phenylmethyl silicone fluid and 30 percent of the described epoxy resin and cured with 0.1 percent aluminum stearate for 2 hours at 100°C., then post-cured for 16 hours at 150°C. to yield a material having a flex strength of 6100 p.s.i. and self extinguishing.

EXAMPLE 6

The silicone resin and epoxy cresol novalac described in Example 4 were blended with catalysts and fillers to provide molding compounds suitable for encapsulating electronic devices. In one embodiment of a preferred molding compound contained 119.6 grams of the silicone resin, 64.4 grams of the epoxy resin, 449 grams of amorphous silica filler, 160 grams of short (1/32 inch) glass fibers and small amounts of lamp black pigment, a polysiloxane release agent and benzoic acid. Sufficient aluminum dihydroxy stearate to provide 1 percent (based on the combined weight of resins) catalyst. These components were mixed by milling the resin and silica on a heated two roll mill, then adding the glass fibers with further milling and lastly blending in the catalyst, pigments and additives by crossmilling several times and cooling to provide a granular molding compound containing 23 percent binder resin.

The moldability of this compound was evaluated by transfer molding for 3 minutes at 800 p.s.i. and 175°C. utilizing a standard spiral flow mold. Freshly prepared compound exhibited 29.5 inches flow. Flex bar samples were molded under the same conditions and exhibited 17,100 p.s.i. flex strength as molded. Post curing for 2 hours at 200°C. increased the flex strength to 21,630 p.s.i. indicating good cure under molding conditions. After immersion in boiling water for 288 hours, the sample retained a flex strength of 12,900 p.s.i. The post-cured sample (2 hours at 200°C.) exhibited low shrinkage (0.0061 in./in.) and weight loss (0.67 percent).

The above described formulation was molded around intergrated circuits (IC's) and button diodes. The IC's were transfer molded utilizing a 20 cavity mold at 2500 p.s.i. and 175°C. with a 3 minute molding cycle. Moldability of the compound was excellent with no gate blockage, no bleed from the compound nor staining of the mold. The compound cured in the mold under these conditions and the cured article released readily from the mold. When tested in an autoclave (15 p.s.i. steam) or boiling water for 240 hours, a greater number of these IC's survived than IC's molded with a commercially available silicone molding compound.

Other molding compounds were formulated utilizing different filler systems, for example, glass fibers were omitted; different additives, for example calcium stearate was utilized as the release agent and different proportions of silicone to epoxy in the binder resin. These formulations had properties rendering them useful in a number of applications for thermosetting molding compounds.

EXAMPLE 7

For purposes of comparison, silicone resin, epoxy resins and mixtures thereof were utilized as binders for molding compounds such as described above. The resin components utilized were the phenylmethylpolysiloxane and epoxy cresol novalac described in Example 4. The molding compound was made by mixing 200 grams of resin, 555 grams of amorphous silica filler, 40 grams of milled glass fibers, and 3 grams of lamp black for about 4 minutes on a two-roll mill. Aluminum benzoate (1.0 grams) was added to the compound and the mixture was milled for an additional two minutes. The properties of the molding compound were evaluated by transfer molding at 800 p.s.i. and 175°C. in a standard spiral mold with a 1.5 minute molding cycle.

Results of transfer molding for compounds containing different base resins are tabulated below:

| Composition of Binder Resin | Spiral Flow (Inches) | Hot Hardness (Shore "D" Durometer) | Moldability |
|---|---|---|---|
| 200 grams of phenylmethyl-polysiloxane catalyzed with 0.5 wt.% aluminum benzoate | 46 | 35–40 | extremely poor release with heavy staining of mold, cured only to a soft gell. |
| 200 grams of epoxy cresol novalac resin catalyzed with 0.5 wt.% aluminum benzoate | 61 | fluid | no cull formed |
| 120 grams of phenylmethyl-polysiloxane and 80 grams of epoxy cresol novalac with no catalyst | 69 | fluid | no cull formed |
| 120 grams of phenylmethyl-polysiloxane and 80 grams of epoxy cresol novalac catalyzed with 0.5 wt.% aluminum benzoate | 9 | 72–78 | released with only slight adhesion to the spiral mold, no mold staining |

The above comparison shows that, under the specified molding conditions, aluminum benzoate is a very weak condensation catalyst, giving partial cure through silanol condensation when utilized with the silicone binder, but exhibits no catalytic activity with respect to the epoxy alone. Curing of the silicone/epoxy mixture does not occur in the absence of the catalyst. The molding composition of the invention (containing aluminum benzoate catalyzed silicone/epoxy mixture) cured readily under the same conditions, giving 9 inches of flow and very good hot hardness. It is apparent that the silanol condensation mechanism does not give the same degree of cure under these conditions.

EXAMPLE 8

Aluminum tri-isopropoxide was mixed with excess phenolic novalac on a heated (150°C.) two-roll mill. After cooling, the granulated material, which may have contained

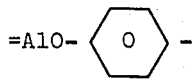

resulting from reaction of phenols with isopropoxide group, was utilized as a catalyst in a molding compound. The molding compound consisted of 120 grams of the phenylmethyl siloxane resin of Example 4, 80 grams of the epoxy resin of Example 4, 40 grams of 1/32 inches glass fibers, 555 grams of amorphous silica, 3 grams of lamp black and 2 grams of the catalyst. The components were milled on a two-roll mill, one roll being heated and the other cooled. After cooling and being granulated, the material was transfer molded at 800 p.s.i. and 175°C. with a 90 second molding cycle and exhibited 18 inches of flow in a spiral flow mold and a hot hardness (durometer-Shore D at 175°C.) of 40–45. Modification of the molding compound by addition of 4 grams of a phosphate ester flow agent and 2 grams of stearic acid gave 22.5 inches of spiral flow under the same molding conditions and a hot hardness of 58–62.

Aluminum hydroxide was prepared by hydrolysis of aluminum tri-isopropoxide and precipitated with excess water. The wet aluminum hydroxide, $Al(OH)_3 \cdot XH_2O$ was an active catalyst when utilized in place of the above aluminum compound in the above-described molding compound. Fifteen grams of the wet aluminum hydroxide was milled with the described quantities of the other components to provide a molding exhibiting 28 inches of flow in the spiral mold (800 p.s.i., 175°C. for 90 sec.) and a hot hardness of 40–45.

An aluminum acetate condensation product of the formula

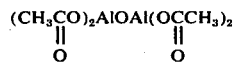

was also utilized as the sole catalyst in the described molding compound formulation. Addition of one gram of this catalyst (0.8 percent based on the weight of resin) provided 18 inches flow and a hot hardness of 70–75 in the testing of the molding compound. A modified molding compound containing 2 grams of the aluminum acetate condensation product and 2 grams of the phosphate ester flow additive exhibited 33.5 inches flow and a hot hardness of 60–65 when tested in the manner described above. Good results (20 inches flow and hot hardness of about 55) were obtained utilizing aluminum benzoate at 0.5% based on resin) as the catalyst and the phosphate ester additive (2% based on resin) in the described molding compound.

EXAMPLE 9

A flexible potting resin was prepared by stirring a heated mixture of 24.5 parts of the phenylmethylsiloxane resin described in Example 4, 9 parts of the diglycidyl ether of bis-phenol A, 0.25 parts of aluminum tri(-sec-butoxide) and 7 parts poly(ethylene oxide) having a molecular weight of approximately 400. The poly(ethylene oxide) was added as a plasticizer to improve shatter resistance in the cured product. This catalyzed mixture had a viscosity of more than 1000 cs. at 25°C. The catalyzed material was cured for 30 minutes at 80°C. to provide a tack-free thermoset resin having very good impact strength.

EXAMPLE 10

To demonstrate the effect of moisture on the rate of reaction, a molding compound was prepared and tested to determine flow and hot hardness, with a sample of the molding compound being exposed to 100% relative humidity for 9 days, then tested. A portion of the exposed sample was dried by placing it in a bell jar over anhydrous calcium sulfate for 3 days and then tested. The molding compound was prepared by milling 120 grams of the silicone resin described in Example 4, 80 grams of epoxy resin described in Example 4, 555 grams of amorphous silica, 40 grams of 1/32-inch glass fibers, 4 grams of glycerin (processing aid) and 1 gram of aluminum benzoate (catalyst). These components were mixed by milling in the manner described in Example 6.

The rate of curing of the described samples determined by transfer molding the compounds at 800 p.s.i. and 175°C. with a 1.5 minute mold cycle utilizing a standard spiral flow mold. Results are tabulated below:

| Sample Description | Flow in Spiral Mold (inches) | Hot Hardness (Shore D-Durometer |
|---|---|---|
| As prepared | 16 | 70–74 |
| Exposed to 100% RH for 9 days | 30 | 32 |
| Dried for 3 days | 19 | 64 |

The shorter the flow during the mold cycle, the faster the cure. The data demonstrate that the cure rate is significantly reduced by the presence of a small amounts of water. Removal of water from the molding compound gave cured properties comparable to those of the "as prepared" samples.

EXAMPLE 11

An epoxy-functional silicone copolymer, containing 55 mol percent

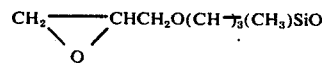

units, the remainder of the siloxy units being diphenylsiloxy and trimethylsiloxy units, was mixed with an equal weight of silanol-terminated, dimethylsiloxy-phenylmethylsiloxy copolymer. The viscosity of the mixture was less than 1000 cs. at 25°C. Aluminum acetylacetonate, sufficient to provide 0.1 weight percent based on the total weight, was added to the mixture. The catalyzed mixture was heated at 150°C. for 48 hours. The cured product was a moderately soft, gel-like solid having some elastomeric properties. This example demonstrates the use of epoxy-functional organosilicon compounds as the epoxy component of the curable compositions of the present invention.

Reasonable modification and variation are within the scope of the invention which is directed to a novel method of obtaining compositions containing ≡SIOC≡ and cured compositions containing ≡SIOC≡.

That which is claimed is:
1. A method of preparing compositions containing silicon-oxygen-carbon bonds comprising reacting under substantially anhydrous conditions
   A. an organosilicon compound containing at least one ≡SiOH group with
   B. a compound containing at least one epoxy group, said reaction being carried out in the presence of a catalytic amount of
   C. an aluminum compound selected from the group consisting of
      a. al(OR)₃ in which R is either a hydrogen atom or selected from the group consisting of alkyl radicals containing from 1 to 20 inclusive carbon atoms or aryl and aryl-containing hydrocarbon radicals containing from 6 to 24 inclusive carbon atoms;

b. 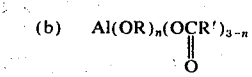

in which R is as previously defined, R' is selected from the group consisting of the hydrogen atom, alkyl radicals containing from 1 to 30 inclusive carbon atoms and aryl or aryl-containing radicals of at least 6 carbon atoms, n having a value of from 0 to 2 and condensates of such compounds;
      c. aluminum salts of the formula H⁺ Al⁻(OR)₄ in which R is as previously defined;
      d. aluminosiloxy compounds of the formula

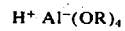

in which R² is selected from the group consisting of —OR radicals in which R is as defined,

radicals in which R' is as defined, monovalent hydrocarbon or halohydrocarbon radicals containing from 1 to 30 inclusive carbon atoms, and siloxane moieties of the formula

in which R³ is selected from the group consisting of OR radicals in which R is as defined,

radicals in which R' is as defined and monovalent hydrocarbon or halohydrocarbon radicals containing from 1 to 30 inclusive carbon atoms, and a has a value of from 1 to 3; The remaining aluminum valences being satisfied by —OAl≡, —OR,

or —OSiR₃² bonding, R, R' and R² being as previously defined; and
      e. aluminum chelates formed by reacting compounds (a), (b) or (c) with sequestering agents in which the coordinating atoms are oxygen.

2. A method in accordance with claim 1 wherein (A) is a hydroxy-functional organopolysiloxane.

3. A method in accordance with claim 2 wherein (A) is of the formula

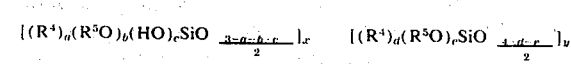

in which $R^4$ is a monovalent hydrocarbon radical selected from the group consisting of alkyl radicals of from 1 to 6 inclusive carbon atoms and the phenyl radical; $R^5$ is an alkyl radical of from 1 to 6 inclusive carbon atoms; $a$ is an integer having a value of 1 or 2; $b$ having a value of 0 or 1, the sum of $a + b$ being no more than 2; $c$ is an integer having a value of 1 or 2, $d$ is an integer having a value of from 1 to 3; $e$ having a value of 0 to 2, the sum of $d + 3$ being no more than 3; $x$ having a value of at least 1 and $y$ having a value of 0 or more.

4. A method in accordance with claim 3 wherein the organopolysiloxane has from 1.0 to 1.7 $R^4$ substituents per silicon atom and contains at least 2 weight percent silanol groups.

5. A method in accordance with claim 2 wherein (B) is a polyepoxide.

6. A method in accordance with claim 5 wherein the polyepoxide (B) is a cycloaliphatic polyepoxide.

7. A method in accordance with claim 5 wherein the polyepoxide (B) is obtained by the reaction of polyhydric phenols with polyfunctional halohydrins.

8. A method in accordance with claim 7 wherein the polyepoxide (B) is obtained by the reaction of polyhydric phenols with epichlorohydrin.

9. A method in accordance with claim 1 wherein the aluminum compound is of the formula

Al(OR)₃

10. A method in accordance with claim 1 wherein the aluminum compound is of the formula

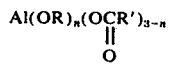

11. A method in accordance with claim 1 wherein the aluminum compound is an aluminum chelate.

12. A method in accordance with claim 1 wherein the aluminum compound is an aluminosiloxy compound of the formula

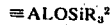

≡ALOSiR₃²

13. A method in accordance with claim 1 wherein the aluminum catalyst is present in an amount in the range of from 0.05 to 5 weight percent based on the total weight of (A) + (B).

14. A substantially anhydrous composition comprising
A. an organosilicon compound containing at least one silicon-bonded hydroxyl group;
B. a compound containing at least one epoxy group;
C. a catalytic amount of an aluminum compound selected from the group consisting of
 a. Al(OR)₃ in which R is either a hydrogen atom or selected from the group consisting of alkyl radicals containing from 1 to 20 inclusive carbon atoms or aryl and aryl-containing hydrocarbon radicals containing from 6 to 24 inclusive carbon atoms;

(b) 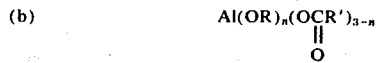

in which R is as previously defined, R' is selected from the group consisting of the hydrogen atom, alkyl radicals containing from 1 to 30 inclusive carbon atoms and aryl or aryl-containing radicals of at least 6 carbon atoms, n having a value of from 0 to 2 and condensates of such compounds;

c. aluminum salts of the formula

H⁺ Al⁻(OR)₄ in which R is as previously defined;

d. aluminosiloxy compounds of the formula

≡ALOSiR₃² in which $R^2$ is selected from the group consisting of —OR radicals in which R is as defined,

—OCR'
‖
O radicals in which R' is as defined, monovalent hydrocarbon or halohydrocarbon radicals containing from 1 to 30 inclusive carbon atoms, and siloxane moieties of the formula

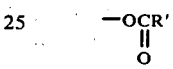

—OSiO₃₋ₙ
|
Rₐ³ in which $R^3$ is selected from the group consisting of OR radicals in which R is as defined,

—OCR'
‖
O

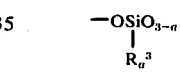

radicals in which R' is as defind and monovalent hydrocarbon or halohydrocarbon radicals containing from 1 to 30 inclusive carbon atoms, and $a$ has a value of from 1 to 3; the remaining aluminum valences being satisfied by —OAl=, —OR,

—OCR'
‖
O

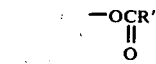

or —OSiR₃² bonding, R, R' and R² being as previously defined; and e. aluminum chelates formed by reacting compounds (a), (b) or (c) with-sequestering agents in which the coordinating atom is oxygen, said organosilicon compond (A) being pesent in an amount sufficient to provide at least 0.1 ≡ SiOH group per epoxy group present in (B).

15. A composition in accordance with claim 14 wherein compound (B) is a polyepoxide.

16. A composition in accordance with claim 15 wherein component (A) is a hydroxy-functional organopolysiloxane of the formula

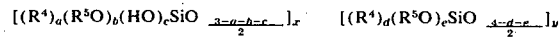 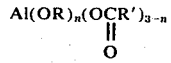

in which $R^4$ is a monovalent hydrocarbon radical selected from the group consisting of alkyl radicals of from 1 to 6 inclusive carbon atoms and the phenyl radical; $R^5$ is an alkyl radical of from 1 to 6 inclusive carbon atoms; $a$ is an integer having a value of 1 or 2; $b$ having a value of 0 or 1, the sum of $a + b$ being no more than 2; $c$ is an integer having a value of 1 or 2, $d$ is an integer having a value of from 1 to 3; $e$ having a value of 0 to 2, the sum of $d + e$ being no more than 3; $x$ having a value of at least 1 and $y$ having a value of 0 or more.

17. A composition in accordance with claim 16 wherein the organopolysiloxane (A) is present in an amount sufficient to provide from 0.5 to 1.5 ≡ SiOH per epoxy group present in (B).

18. A composition in accordance with claim 16 wherein said organopolysiloxane is a phenylpolysiloxane resin having a degree of substitution of from 1.0 to 1.7; a phenyl to silicon ratio of 0.2 to 1.5 and a silicon-bonded hydroxyl content of from 2.5 to 10 weight percent.

19. A composition in accordance with claim 18 wherein the polyepoxide (b) is selected from the group consisting of the glycidyl ethers of polyphenols and cycloaliphatic polyepoxides.

20. A composition in accordance with claim 19 wherein the phenylpolysiloxane resin is of the formula

in which R is an alkyl of from 1 to 3 inclusive carbon atoms, $a$ has an average value of from 1.0 to 1.7, the phenyl to silicon ratio being in the range of 0.2 to 1.5, the silicon-bonded hydroxyl content of said resin being in the range of 2.5 to 7.5 weight percent.

21. A composition in accordance with claim 19 containing a solid filler.

22. A composition in accordance with claim 21 wherein the filler is present in an amount in the range of 30 to 90 weight percent based on the total weight of the composition.

23. A composition in accordance with claim 22 wherein the filler includes granular fused silica and glass fibers.

24. A composition in accordance with claim 20 wherein the aluminum catalyst (C) is an aluminum acylate of the formula

25. A composition in accordance with claim 24 comprising
A. from 10 to 60 weight percent of the polysiloxane resin
B. from 49 to 90 weight percent of the polyepoxide
C. from 0.1 to 5 weight percent, based on the combined weight of (A) and (B) of aluminum acylate catalyst.

26. A composition in accordance with claim 25 wherein the polyepoxide is an epoxy functional cresol novalac resin.

27. A composition in accordance with claim 25 wherein the polyepoxide is the diglycidyl ether of bisphenol A.

28. A composition in accordance with claim 25 wherein the polyepoxide is a cycloaliphatic polyepoxide having an epoxide equivalent of more than 65.

29. A composition in accordance with claim 25 wherein the aluminum acylate (C) is selected from the group consisting of aluminum stearates and aluminum benzoates.

30. A cured composition in accordance with claim 15.

31. A composition in accordance with claim 14 wherein the aluminum compound is of the formula $$Al(OR)_3$$

32. A composition in accordance with claim 14 in which the aluminum compound is of the formula

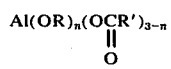

33. A composition in accordance with claim 14 wherein the aluminum compound is of the formula

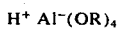

34. A composition in accordance with claim 14 wherein the aluminum compound is of the formula

35. A composition in accordance with claim 14 wherein the aluminum compound is an aluminum chelate.

36. A composition in accordance with claim 14 wherein at least a portion of the epoxide comprise a brominated epoxy compound.

* * * * *

UNITED STATES PATENT AND TRADEMARK OFFICE
CERTIFICATE OF CORRECTION

PATENT NO. : 3,971,747

DATED : July 27, 1976

INVENTOR(S) : HOWARD W. BANK ET AL

It is certified that error appears in the above-identified patent and that said Letters Patent are hereby corrected as shown below:

Column 21, line 67 should read
-- a. $Al(OR)_3$ in which R is either a hydrogen atom or --

Column 22, line 50, "The" should read --the--

Column 22, line 63, "hydroxy-functional" should read --hydroxyl-functional--

Column 23, line 8, "sum ofa + b" should read --sum of a + b--

Column 23, line 11, "d +3" should read --d + e--

Column 23, line 50, should read -- $\equiv AlOSiR_3^2$ --

Column 24, line 18, should read -- $=AlOSiR_3^2$ --

Column 24, line 47, "defind" should read --defined--

UNITED STATES PATENT AND TRADEMARK OFFICE
CERTIFICATE OF CORRECTION

PATENT NO. : 3,971,747
DATED : July 27, 1976
INVENTOR(S) : HOWARD W. BANK ET AL

It is certified that error appears in the above-identified patent and that said Letters Patent are hereby corrected as shown below:

Column 24, line 57, "$-OSIR_3{}^2$" should read $--OSiR_3{}^2--$

Column 24, line 62, "pesent" should read --present--

Column 26, line 9, "the polysiloxane" should read
--the phenyl polysiloxane--

Signed and Sealed this

Fifth Day of August 1980

[SEAL]

Attest:

SIDNEY A. DIAMOND

Attesting Officer

Commissioner of Patents and Trademarks